Oct. 13, 1936.                H. M. NICHOLLS                2,056,977
                                CONTAINER
                            Filed Nov. 26, 1935
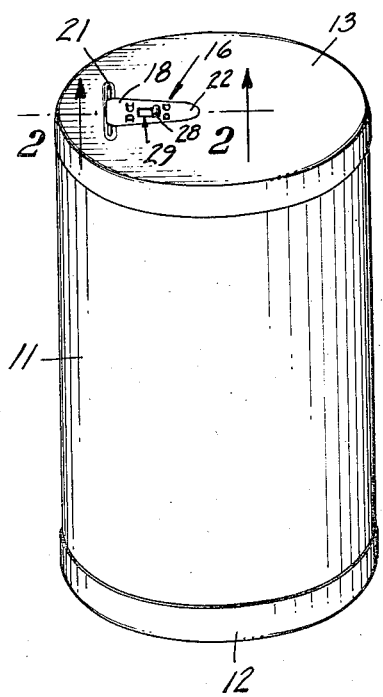
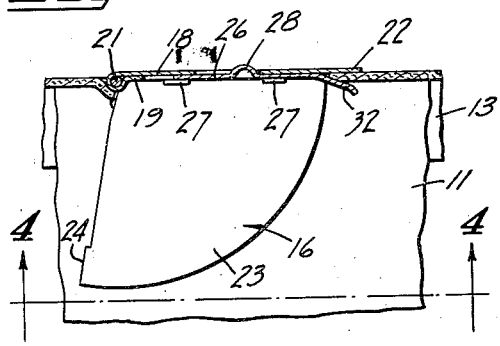
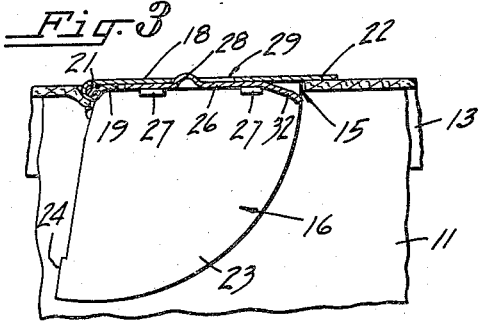
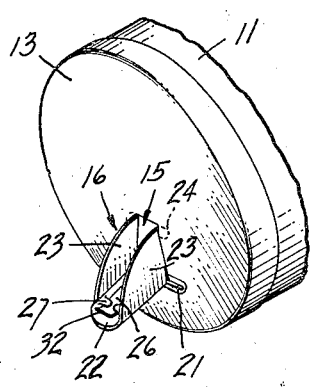
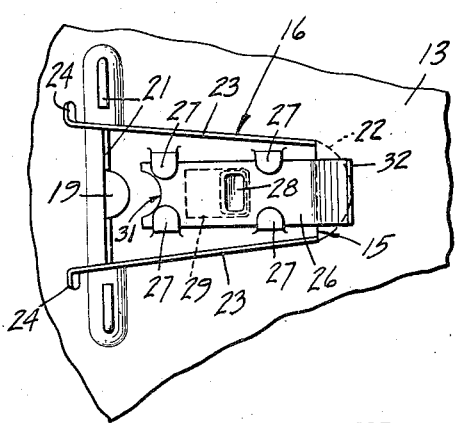
INVENTOR
Henry M. Nicholls
BY
ATTORNEYS Patented Oct. 13, 1936

2,056,977

UNITED STATES PATENT OFFICE 2,056,977

CONTAINER

Henry M. Nicholls, Chicago, Ill., assignor to American Can Company, New York, N. Y., a corporation of New Jersey Application November 26, 1935, Serial No. 51,689

4 Claims. (Cl. 221—11)

The present invention relates to containers having hinged pouring spouts for dispensing the contents of the container and has particular reference to devices for locking the spout in closed position against accidental opening during shipment and storage of the container.

An object of the invention is the provision in a container hinged pouring spout, of devices for locking the spout in a closed position during shipment and storage of the container, wherein the locking devices are embodied in the spout, being movable with the latter as it is swung into open and closed positions and being of such a design as to permit unrestricted flow of the container contents through the spout when it is in open dispensing position.

Numerous other objects and advantages of the invention will be apparent as it is better understood from the following description, which, taken in connection with the accompanying drawing, discloses a preferred embodiment thereof.

Referring to the drawing:

Figure 1 is a perspective view of a container closed with a cover having a pouring spout embodying the instant invention, the pouring spout being shown in closed and locked position;

Fig. 2 is an enlarged fragmentary sectional detail of the upper end of the container and a part of the cover showing the pouring spout in section and in closed and locked position, the view being taken substantially along the line 2—2 in Fig. 1;

Fig. 3 is a sectional view similar to Fig. 2 showing the pouring spout closed and the locking devices withdrawn from spout locking position;

Fig. 4 is a view of the under side of the container cover and the pouring spout showing the latter in closed and locked position, being illustrated as if viewed substantially along the line 4—4 in Fig. 2; and Fig. 5 is a perspective view of the upper end of the container illustrated in Fig. 1 showing the container tilted and the pouring spout open and in pouring position as when dispensing the container contents.

A preferred embodiment of the invention as disclosed in the drawing includes a container consisting of a tubular body 11 closed at its ends by a bottom closure 12 and a top closure or cover 13. The container may be utilized to hold granular or pulverized material such as for example, salt, sugar, spices and the like which are preferably adapted to be dispensed through a trapezoidal shaped opening or aperture 15 provided in the cover top wall.

A pouring spout 16 having a top wall 18 is hingedly disposed in the opening 15 and is adapted to be moved into an open or dispensing position as illustrated in Fig. 5 or into a closed position as shown in Fig. 1. The spout is connected to the cover top wall by a hinge including a hinge lug 19 which extends from the rear edge of the spout wall and which surrounds a pintle or staple 21 carried in the cover top wall adjacent the rear edge of the aperture. The forward end of the spout top wall is formed with a lip or finger extension 22 which overlies the cover wall when the spout is in closed position and acts as a stop for limiting the closing movement of the spout.

The spout is also provided with integrally formed resilient side wall wings 23 which extend through the aperture 15 and have lug projections 24 which engage against the under side of the cover top wall when the spout is open to properly locate the spout in pouring position. This is a usual form of pouring spout often used in dispensing containers of this kind and well known in the art.

The spout 16 is provided with a locking device mounted to swing bodily with the spout and which consists of a flat slide plate 26 carried on the under side of the spout top wall 18. The plate is supported on pairs of spaced guide lugs 27 struck out from the spout top wall and arranged along opposite longitudinal edges of the slide. A lug 28 embossed on the plate extends up through a slot 29 formed in the spout top wall and provides a finger hold accessible from the outside of the container when the spout is closed, for sliding the plate back and forth longitudinally of the spout top wall along the guide lugs 27. The rear edge of the slide is provided with a clearance recess 31 (Fig. 4) which permits full travel of the slide on its back stroke without interference with the hinge lug 19.

At its forward end the slide plate is bent downwardly providing a sloping latch end 32. This latch end is adapted to engage under the cover wall adjacent the edge of the aperture 15 at the point where the spout extension 22 engages the top of the cover wall. The latch holds the pouring spout against accidental opening when the latter is closed and when the slide is moved into its forward or locking position as shown in Figs. 2 and 4. A reverse movement of the slide withdraws its latch end 32 from engagement with the cover wall as shown in Fig. 3 and hence permits the usual opening of the spout.

Such a locking slide provides a simple, compact and reliable locking device which may be used in place of temporary devices such as stickers, labels, staples, etc., for holding the spout closed during shipment and storage of the container and may also be used by the ultimate consumer for locking the spout closed against accidental opening when the container is not in use.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container provided with a wall having an aperture for dispensing the contents of said container, a pouring spout mounted for swinging movement through said aperture and adapted when in one position to close the latter, and a movable member carried by the spout for engagement with the container wall adjacent the edge of the aperture when the spout is closed for holding the latter in container closing position and against accidental opening during shipment and storage.

2. A container provided with a wall having an aperture for dispensing the contents of said container, a pouring spout hingedly connected to said wall and adapted when in one position to close the aperture and to engage against one side of said wall, and a slide carried by the spout and slidable into a position engaging the opposite side of said container wall when the spout is closed for locking the latter in container closing position and against accidental opening during shipment and storage.

3. A pouring spout adapted to seat into and close a dispensing aperture in a wall of a container, said spout comprising a top wall hingedly connected to said container wall for closing said aperture when the spout is in closed position, an extension of said top wall engaging against one side of said container wall to limit the closing movement of said spout, and a member carried by said spout top wall and movable into and out of engagement with the opposite side of said container wall when the spout is closed for holding the latter in container closing position and against accidental opening during shipment and storage.

4. A pouring spout adapted to seat into and close a dispensing aperture in a wall of a container, said spout comprising a top wall hingedly connected to said container wall for closing said aperture when the spout is in closed position, an extension of said top wall engaging against one side of said container wall to limit the closing movement of said spout, a spout locking slide carried by said spout top wall and movable with said spout as a unit, and means associated with said slide for moving the latter independently of and relative to said spout for engaging the slide under said container wall when the spout is closed in order to lock said spout in container closing position.

HENRY M. NICHOLLS.